(No Model.)
H. M. SHEER.
INCUBATOR.
No. 501,735. Patented July 18, 1893.
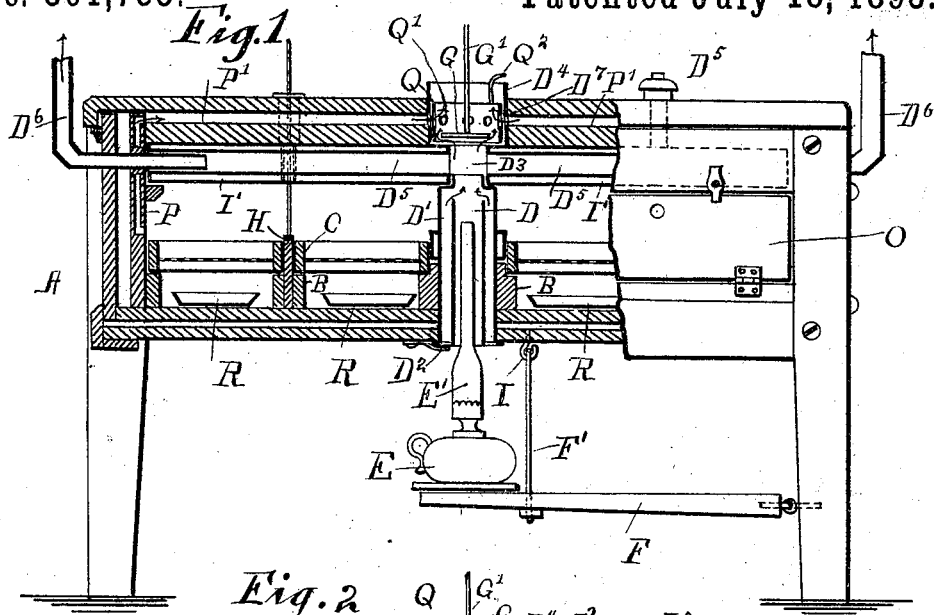
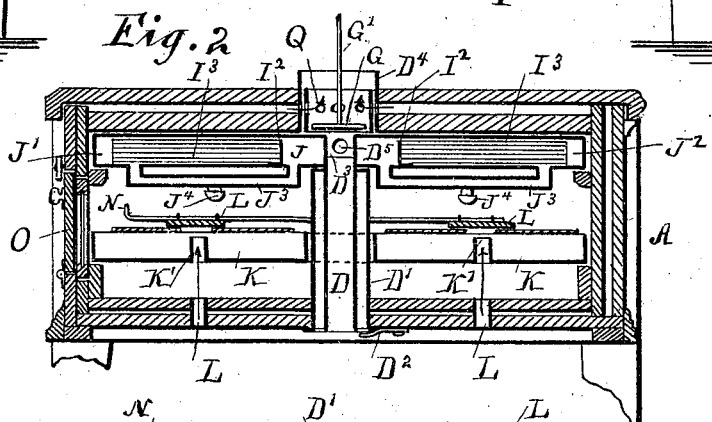
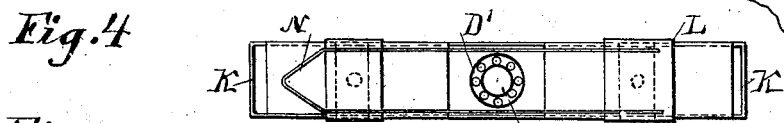
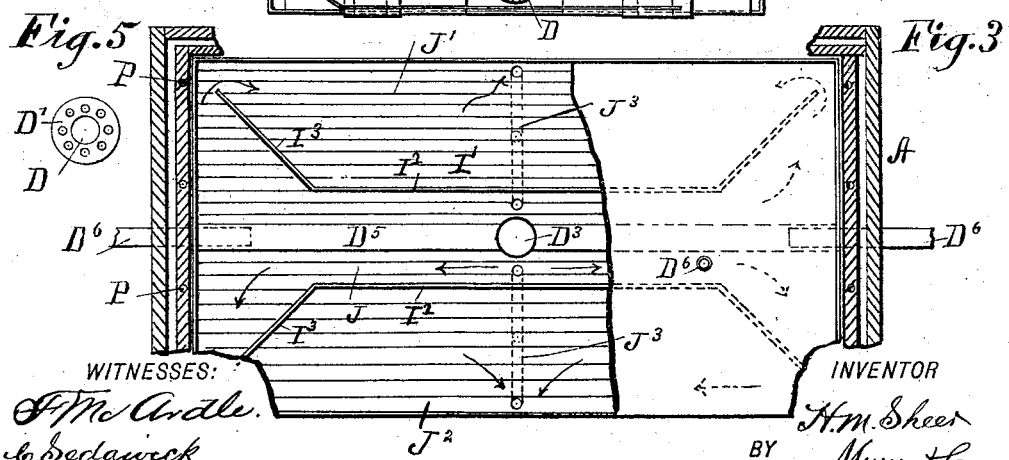
WITNESSES:
F. McArdle.
C. Sedgwick.
INVENTOR
H. M. Sheer
BY Munn & Co
ATTORNEYS.

UNITED STATES PATENT OFFICE.

HENRY M. SHEER, OF QUINCY, ILLINOIS, ASSIGNOR TO HIMSELF AND GEORGE ERTEL, OF SAME PLACE.

INCUBATOR.

SPECIFICATION forming part of Letters Patent No. 501,735, dated July 18, 1893.

Application filed November 5, 1892. Serial No. 451,078. (No model.)

*To all whom it may concern:*

Be it known that I, HENRY M. SHEER, of Quincy, in the county of Adams and State of Illinois, have invented a new and Improved Incubator, of which the following is a full, clear, and exact description.

The object of the invention is to provide a new and improved incubator, which is simple and durable in construction, arranged to properly heat the egg chamber and to supply the necessary amount of moisture to the eggs.

The invention consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1 is a sectional side elevation of the improvement. Fig. 2 is a transverse section of the same. Fig. 3 is a sectional plan view of the water heater. Fig. 4 is a plan view of the moisture pans; and Fig. 5 is an inverted plan view of the heat flue.

The improved incubator is provided with a suitably-constructed casing A mounted on suitable legs and preferably provided with double sides, bottom and top, as plainly shown in the drawings. The interior of the casing A is provided with transversely-extending cleats B forming rests for the crates C containing the eggs to be hatched.

In the center of the casing A is arranged a heat flue D surrounded by an air supply pipe D' both connected with each other at their lower ends by a perforated bottom plainly shown in Figs. 1 and 5. A pivoted latch $D^2$, held on the under side of the bottom of the casing A, serves to support the said heat flue and air pipe in position in the casing A, it being understood that the lower ends of the said flue and pipe extend through the bottom of the casing A, to the outside.

Into the heat flue D extends the chimney E' of a lamp E supported on a bracket F hinged to one of the legs supporting the casing A, the said bracket being supported near its free end by a rod F' hooked on a screw I attached to the under side of the bottom of the casing A. To disengage the chimney E from the heating flue D, the bracket F is pushed rearward sufficiently to admit the lamp to be lowered and so removed from the heating flue D. The upper end of the air flue D' extends a short distance above the upper end of the heat flue D and opens into a hot air distributing flue $D^3$, on the upper end of which is adapted to be seated a valve G held on a rod G', automatically controlled by a thermostatic bar H, arranged within the casing A in the chamber containing the egg trays C above mentioned. This thermostatic bar H forms part of a thermostatic regulator more fully shown and described in detail in an application for Letters Patent of the United States, Serial No. 451,077, and filed under even date herewith, so that a further description and illustration of the same are not deemed necessary. It suffices to say that when the heat increases in the casing A, the valve G is unseated to permit the heat arising from the lamp E to pass upward and out of the distributing chamber $D^3$ into the outlet $D^4$ passing through the top of the casing A.

The valve G is seated on the end of the chamber $D^3$, as long as the temperature is normal within the casing A. From the distributing chamber $D^3$ lead pipes $D^5$, which extend horizontally through the water heater I', so as to heat the water contained in the said water heater. The outer end of each of these pipes $D^5$ is connected with a chimney flue $D^6$ extending through the respective end of the casing A to permit the air to escape to the outside.

The hot water heater I' is provided with a tank supported in a horizontal position on suitable cleats within the casing A above the crates C carrying the eggs. The tank of the water heater is provided with two longitudinally extending partitions $I^2$, each formed at its ends with angularly extending deflecting plates $I^3$, as plainly shown in Fig. 3. The partitions $I^2$, divide the tank into a central channel J and two side channels J' and $J^2$ connected with the said central channel J at the ends of the deflecting plates $I^3$ of the partitions I², as will be readily understood by reference to Fig. 3. The side channels J' and J² are connected with the central channel J, near the heat distributing chamber D³ by means of transversely extending pipes J³ extending under the said channels and leading into their respective bottoms, as will be readily understood by reference to Fig. 2. Each of the pipes J³ is provided with a drain cup J⁴, to remove the water from the hot water heater whenever desired. By reference to Fig. 3, it will be seen that the air outlet flues D⁵ extend through the central channel J and the pipes J³ lead into the said central channel near the air distributing chamber D³.

Now, it will be seen that when the valve G is closed, and the lamp E burns, the heat emanating from the chimney E' causes a suction of air in the air pipe D' so that heated air passes into its central distributing chamber D³, and from the latter through the pipes D⁵ to the chimney flue D⁶. The air in the distributing chamber D³, and the pipes D⁵ heats the water in the central channel J of the hot water heater I, so that the water flows from about the middle of the channel J to the ends thereof, to finally pass along the deflecting plates I³ into the side channel J' and then toward the center or middle of the tank to finally pass through the pipes J³, which deliver the water in a cool condition to the central channel J at or near the hot water distributing chamber D³. As the water is heated to the highest degree, around the air distributing chamber D³, and returns near the same by the pipes J³ in a cooler condition, a circulation of water within the tank is established, without the water passing to the outer air.

On opposite sides of the air inlet pipe D' are arranged the water pans K partly open on the top to permit the water contained in the said pans to evaporate, so that the chamber containing the egg trays is supplied with the necessary moisture. Each of the pans K is partly heated by having its inner end close to the air pipe D', so that the evaporation of the water is somewhat facilitated. In the bottom of each pan K is arranged an upwardly extending pipe K', through which air can pass from the outside by means of a short pipe L extending through the bottom of the casing A directly opposite the pipe K'. On the top or cover of each pan K is arranged a slide L located directly above the short pipe K' to deflect the air over the water contained in the respective pan K.

It is understood that the moist air passes out of the pans near the ends of the same, through openings or transverse slots formed in the fixed cover or top of the respective pan. A rod N connects the two slidings covers L with each other, so as to shift the latter to the desired position. The rod N is formed at one end with a handle adapted to be taken hold of by the operator, through one of the doors O held in the said casing A. The egg chamber containing the trays is provided in the end walls of the casing A with ventilating channels P extending vertically and connecting at their upper ends, with longitudinally extending channels P' leading to apertures D⁷ in the outlet pipe D⁴. A ring Q is held in this outlet pipe D⁴ and is provided with apertures Q' adapted to register with the apertures D⁷ so as to regulate the out flow of the air from the egg chamber, through the channels P, P', and outlet pipe D⁴. A handle Q² is secured on the ring Q and extends above the pipe D⁴ so that the operator can conveniently shift the said ring for regulating the outlet of the air through the said channels P, P', as above described. Below each egg crate C, is held in the bottom of the casing A, a tray R, containing moistened sand, to draw in any foul air accumulating in the lower part of the casing A.

Having thus fully described my invention, I claim as new and desire to secure by Letters Patent—

1. The combination with the casing and its hot water vessel provided with a vertical hot air flue D³ leading through it and having a valve controlled communication at its upper end with the exterior of the casing, and the lateral branches leading through the water vessel from said flue, of the imperforate pipe D', extending upwardly from an opening in the bottom of the casing to the lower end of the flue D³ and the pipe D, (for the lamp chimney) within and of less length than the pipe D' to permit the annular air space between said two pipes D D' to open into the lower end of flue D³, substantially as set forth.

2. An incubator comprising a hot air distributing chamber and flues leading therefrom, and a hot water heater formed with a horizontally disposed tank, having a central channel into which extends the said air distributing chamber and the said air flues, side channels connected at their ends with the central channel, return pipes connecting the said side channels with the said central channel at or near the said hot air distributing chamber, and a valve adapted to open and close the top of the said air distributing chamber, to regulate the amount of heat passing through the said air flues, substantially as shown and described.

3. The combination with the casing having cold air inlets, its central hot air pipe, and the water vessel having hot air flues communicating with said pipe, of the elongated moistening pan provided with a central vertical opening to receive said hot air pipe therethrough, cold air pipes K' and two connected slides L L over said pipes, substantially as set forth.

4. An incubator provided with a casing supporting the egg trays within the egg chamber, vertical channels formed in the end walls of the said casing, horizontal channels formed in the top of the said casing, and connecting with the said vertical channels, a central outlet pipe into which discharge the said horizontal
5 channels, and a perforated ring mounted in the said outlet pipe and adapted to register with the said horizontal channels leading to the outlet pipe, substantially as shown and described.

HENRY M. SHEER.

Witnesses:
    HOPE S. DAVIS,
    GEORGE ERTEL.